UNITED STATES PATENT OFFICE.

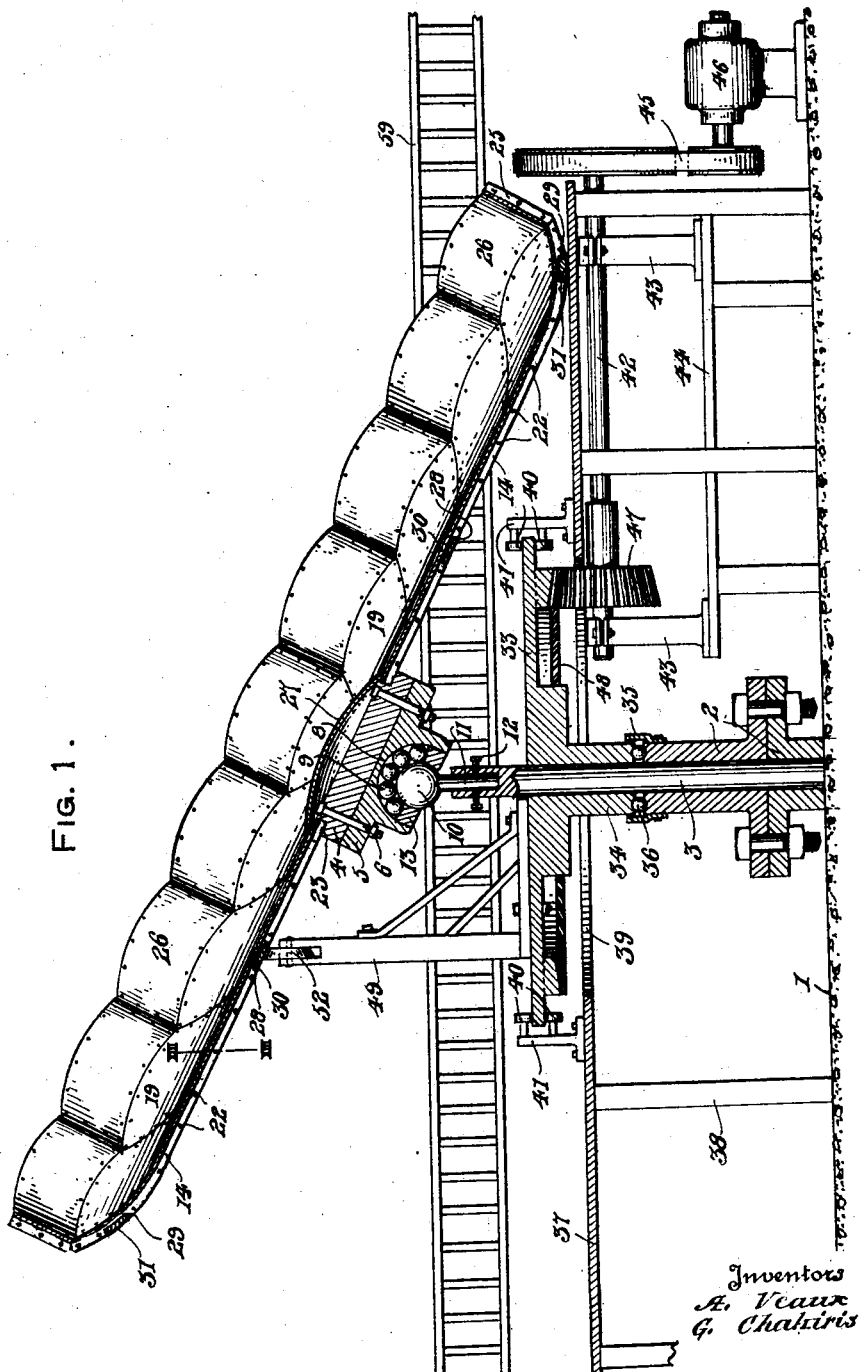

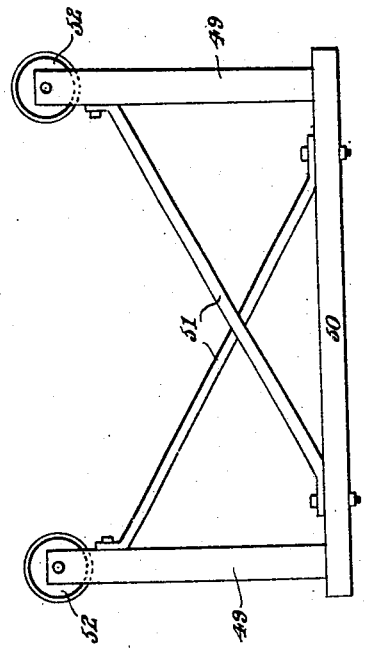
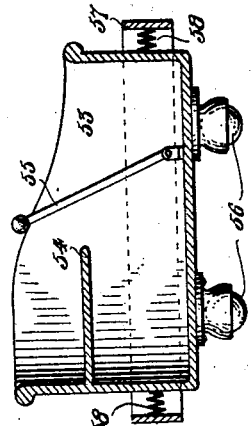
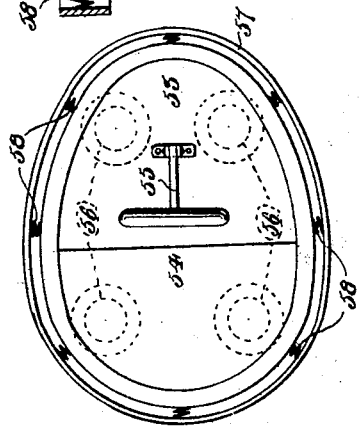
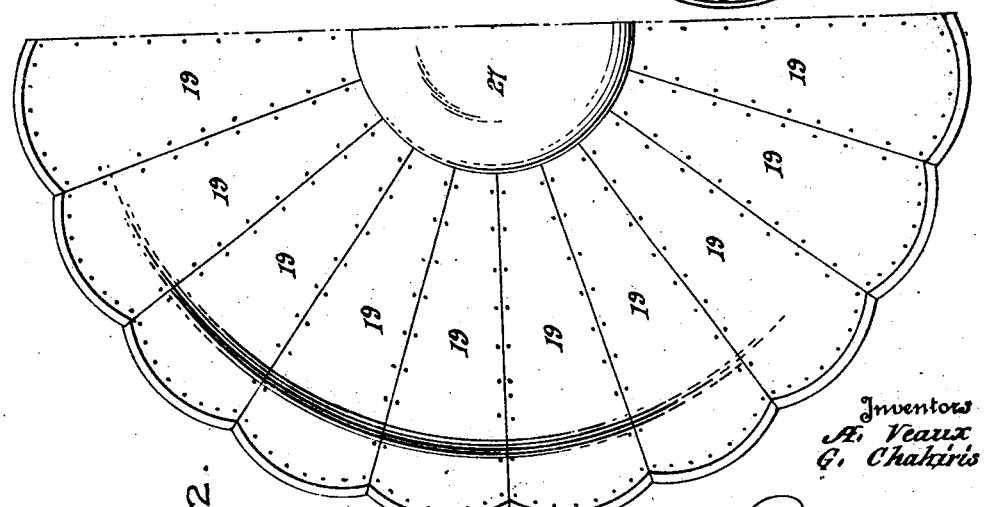

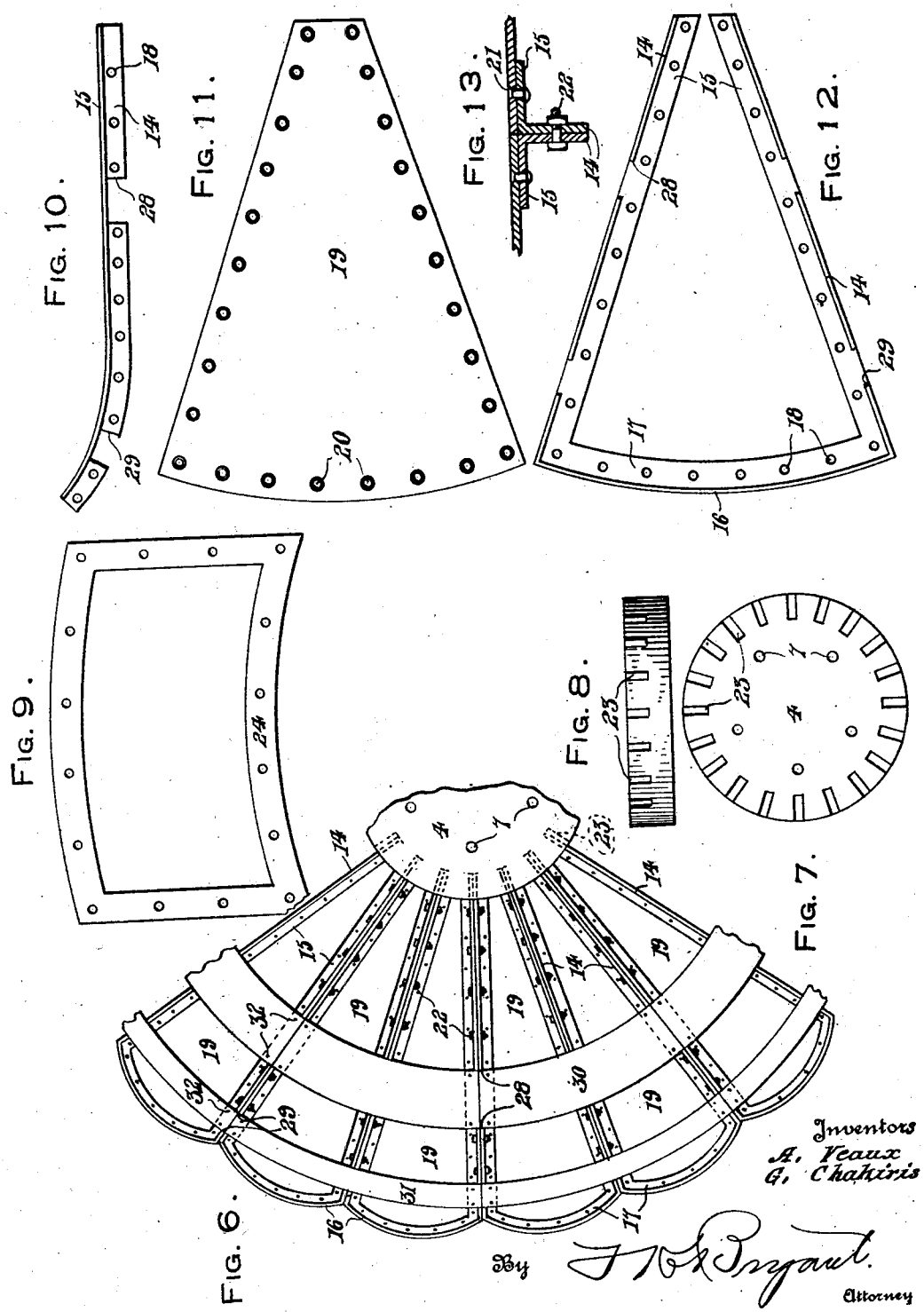

AUGUSTE VEAUX AND GEORGE CHAKIRIS, OF RYE, NEW YORK.

AMUSEMENT DEVICE.

1,409,071.  Specification of Letters Patent.  Patented Mar. 7, 1922.

Application filed March 7, 1921. Serial No. 450,277.

*To all whom it may concern:*

Be it known that we, AUGUSTE VEAUX and GEORGE CHAKIRIS, GEORGE CHAKIRIS being a citizen of Greece, and residing in the village and town of Rye, Westchester County, New York, and AUGUSTE VEAUX a citizen of the United States of America, residing at Rye, in the county of Westchester and State of New York, have invented certain new and useful Improvements in Amusement Devices, of which the following is a specification.

This invention relates to certain new and useful improvements in amusement devices and has particular reference to an amusement device wherein a plurality of passenger carrying cars are freely movable upon a constantly shifting bowl to cause the cars to move in different directions.

The primary object of the invention resides in the provision of an amusement device wherein a dish or bowl-shaped member has an axially universal support, with the bowl-shaped member constantly tilted by a frame mounted on a rotatable disk beneath the bowl with the lower edge of the bowl constantly engaging a platform beneath the disk and changing its position relative to the platform upon rotation of the disk, freely movable passenger carrying cars within the bowl traversing within the bowl during shifting movements thereof.

A further object of the invention embodies an amusement device wherein an axially supported bowl is constantly tilted by engagement with a frame supported on a revolving disk beneath the bowl with the lower end of the bowl engaging a platform positioned beneath the same, with bearing rollers carried by the frame engaging the bottom wall of the bowl and moving thereover during rotation to cause the lower edge of the bowl to remain in rolling engagement with the platform, a suitable source of motive power being associated with the disk to rotate the same and with cooperating guide devices carried by the disk and platform.

A still further object of the invention resides in the provision of an amusement device wherein a bowl containing passenger carrying cars constantly changes its position relative to the bowl supporting means with the outer wall of the bowl formed of concaved panel sections with a convex disk plate arranged centrally of the bowl for engagement by the cars during movement of the bowl to cause the cars to move within the bowl in different directions, a rotatable frame being positioned beneath the bowl for engagement therewith to cause the bowl to constantly assume a tilted position with the speed of movement of the cars within the bowl being regulated by the speed of rotation of the bowl engaging frame.

A still further object of the invention has reference to an amusement device embodying an axially supported bowl and a platform positioned therebeneath, concentric track rails being carried by the bottom face of the bowl with the outer track rail constantly engaging the platform with a roller supporting frame rotatably mounted beneath the bowl for engagement with the inner track rail to cause the bowl to assume a tilted position.

The invention further contemplates, as improvements in the art to which the same relates, the novel construction of the car supporting bowl, the axial universal mounting therefor, the bowl engaging frame and rotatable disk supporting the frame and the driving mechanism for the disk.

The invention further provides for a novel type of passenger carrying car especially designed for an amusement device of the character above set forth wherein a resiliently mounted bumper surrounds each car with the cars freely mounted within a shiftable bowl.

With the above general objects in view, and others that will become apparent as the nature of the invention is better understood, the same consists in the novel form, combination and arrangement of parts hereinafter more fully described in connection with the accompanying drawings, and in which like reference characters refer to corresponding parts throughout the several views.

In the drawings,

Figure 1 is a longitudinal sectional view of an amusement device constructed in accordance with the present invention, showing the axial universal mounting for the shifting bowl, the rotating disk and frame carried thereby engaging the bowl to cause the same to assume a tilted position and the driving mechanism for the disk, Figure 2 is a fragmentary top plan view of the shifting bowl, Figure 3 is a detached side elevational view of the roller carrying frame engaging the bottom face of the bowl, Figures 4 and 5 are top plan and sectional views respectively of the passenger carrying cars showing the enclosing bumpers therefor.

Figure 6 is a fragmentary bottom plan view of the bottom of the bowl showing the angle bar construction of the bowl sections and the concentric track rails carried thereby, Figures 7 and 8 are top plan and side elevational views respectively of the central block of the bowl to which the bowl sections are secured, Figure 9 is an elevational view of one of the frames of the side wall of the bowl, Figure 10 is a side elevational view of one of the angle bar segments of the bowl showing the cut away portions for the track rails.

Figure 11 is a top plan view of one of the bottom sections of the bowl,

Figure 12 is a bottom plan view of one of the bowl segments, and

Figure 13 is a detail sectional view showing the connection between adjacent angle bar segments and the bottom plates of the bowl.

Briefly described, the present invention aims to provide an amusement device embodying a supporting standard having a universal connection with the central portion of a bowl, a bearing block being carried axially of the bowl for mounting on the upper end of the standard. The bowl is of angle iron and plate construction embodying radiating angle iron sections connected to the central bearing block with bottom plates connected to the angle iron sections while the side walls of the bowl include concaved plates adapted to engage the passenger carrying cars freely movable within the bowl for causing the same to traverse the bowl in different directions. A convex disk is arranged axially of the bowl for engaging the cars to give jolts and different movements thereto. Concentric track rails are carried by the bottom side of the bowl with the outer rail normally engaging a sub-platform and maintained in constant engagement therewith by a frame carrying roller bearings engaging the inner track rail with the frame mounted on a disk rotatable on the central standard. A circular gear is formed on the bottom face of the disk and is driven by a gear operatively connected to a suitable source of motive power. The passenger carrying car employed with this device includes an enclosing resiliently mounted buffer band for absorbing shocks when cars contact each other and abut the side walls of the bowl.

Referring more in detail to the accompanying drawings, and particularly to Figure 1, it being understood that the device is of extremely heavy construction, the same is mounted upon a concrete base 1 with perpendicular bearings 2 supporting a standard 3.

A bowl is axially supported on the upper end of the standard 3, the same embodying a central block 4 secured to a bearing block 5 by fastening bolts 6 passing through registering openings 7 in the blocks with the lower face of the bearing block 5 provided with a concave seat 8 as clearly shown in Figure 1 for the reception of bearing balls 9 engaged by the ball head 10 on the upper end of the stem 11 adjustably mounted in a socket in the upper end of the standard 3 and retained in adjusted positions therein by set screws 12, the bearing balls 9 being retained within the concaved seat 8 and in rolling engagement with the stem head 10 by the ring 13 threaded in the open end of the socket 8 and having a central opening accommodating the stem head as illustrated.

The construction of bowl is shown more clearly in Figures 1, 2, and 6 to 13, the bottom wall of the bowl being formed of segment-shaped angle irons including side bars 14 and side extensions 15 diverging outwardly from the axis of the bowl with the walls 14 and 15 connected by the curved sections 16 and 17 respectively, said sections 14 to 17 being provided with perforations 18 for the reception of the retaining bolts and rivets. Segment-shaped plates 19 are mounted on the upper flanges 15 and 17 of the angle iron frames and are provided with openings 20 adjacent the edges thereof registering with the openings in the flanges 15 and 17 and into which openings rivets 21 are inserted for securing the plates 19 to the angle irons. The connection between adjacent flanges 14 of the segment shaped sections is shown more clearly in Figure 13 wherein retaining bolts 22 pass through alined openings in the angle iron flanges 14. The axial block 4 of the bowl, as shown in Figures 1 and 6 to 8 has the upper face thereof provided with radial sockets 23 opening at the edge of the block and into which sockets the inner ends of the connected adjacent angle iron flanges 14 are received for supporting the bowl sections on the block. The outer ends of the segment-shaped frames are curved upwardly as shown in Figures 1 and 10 and have secured to the flanges 16 thereof, the outwardly curved rectangular frames 24 shown in Figure 9, the perpendicular end walls of the frames 24 being secured to angle extensions of the end angle bars 25 shown in Figure 1 with the angle bars 25 having the adjacent flanges connected together to form a continuous side wall for the bowl. Outwardly curved plates 26 of the form shown in Figure 1 are secured to the rectangular frames 24 to form a continuous corrugated side wall for the bowl. A convex disk 27 is arranged centrally of the bowl bottom and overlies the block 4 for purposes presently to appear. As shown in Figures 1, 6, and 10, the flanges 14 are provided with cut away portions 28 and 29 arranged concentrically of the bowl, the segment-shaped angle frames having the flanges 15 thereof undisturbed as shown in Figure 10. A pair of concentric track rails 30 and 31 are positioned in the cut away portions 28 and 29 respectively, the track rails being formed of sections as shown in Figure 6 with the adjacent ends thereof secured as at 32 to the flanges 15 of the segment-shaped frames.

A disk 33 having a central hub 34 is rotatably mounted on the standard 3 with the lower end of the hub confined within the flange collar 35 carried by the support 2 with ball bearings 36 between the disk hub and the support. A platform 37 supported on legs 38 has a central opening 39 through which the disk hub extends as shown in Figure 1, the disk being guided in its rotary movement by the bearing rollers 40 engaging the upper and lower faces of the disk, said rollers being carried by brackets 41 mounted on the platform 37. To rotate the disk 33, a driven shaft 42 journaled in bearings 43 mounted on a table 44 has a belt connection 45 with a motor 46, a bevel gear 47 fixed to the shaft 42 meshing with the beveled circular rack 48 formed on the bottom face of the disk 33.

The connection between the rotating disk 33 and the bowl is shown more clearly in Figures 1 and 3, a U-shaped frame embodying vertical standards 49 and a cross base bar 50 with angle braces 51 is supported on the disk 33 to rotate therewith, the upper ends of the standards 49 having journaled therein beveled friction wheels 52 that are in constant rolling engagement with the inner track rail 30 as shown in Figure 1. When so positioned, the outer track rail 31 is in engagement with the platform 37 with the result that the bowl constantly assumes a tilted position irrespective of the relation between the roller supporting frame and the bowl.

A special type of passenger carrying car is freely disposed within the bowl, the same being more clearly shown in Figures 4 and 5 as embodying a car body 53 having a passenger seat 54 and a gripping handle 55, the car being supported on ball casters 56. A band 57 encloses the body of the car with cushioned springs 58 introduced between the band and car body to absorb shocks when the car moves into engagement with the sides of the bowl body or when cars engage each other.

In the operation of the device, assuming that a plurality of cars 53 are freely positioned within the bowl, the motor 46 is set into operation to communicate motion to the shaft 42 and through the medium of the bevel gear 47 to the disk 33, the roller supporting frame carried by the disk engaging the inner track rail 30 constantly maintains the bowl in the tilted position shown in Figure 1 with the outer track rail 31 engaging the platform. During rotation of the disk 33, the roller frame carried thereby causes the rollers 52 to move over the track rail 30 and constantly change the position of the bowl relative to the stationary platform 37, during which time the outer track rail 31 substantially rolls over the platform 37. The cars within the bowl being mounted on ball casters will be freely movable within the bowl and considerable excitement and pleasure will be obtained when the cars abut the outer wall sections of the bowl to move over the curved surfaces thereof and to be directed toward the center of the bowl for engagement with the convex disk 37 partially tilting the car and causing the car to travel in various directions within the bowl.

The speed of rotation of the disk 33 is controlled by the motor 46 and when the disk 33 revolves slowly the cars within the bowl will be violently shifted, while greater speed of rotation of the disk will cause the cars to move toward the axis of the bowl and be substantially limited in their movements in the bowl. The stem 11 may be adjusted within the standard 3 for equalizing the distribution of the weight of the bowl on the three points of suspension, i. e., the rollers 52, the stem ball 10 and the stationary platform 37. As shown in Figure 1, a guard rail 59 surrounds the platform 37 to control access to the car carrying bowl. The outer walls of the bowl are of a height to permit passengers to easily step thereover without the necessity of providing a door entrance which would tend to weaken the wall construction when engaged by cars shifted about within the bowl. The device as illustrated in this application has been designed from a practical standpoint, the structural details of the invention providing for an absolutely safe amusement device with all liability of the cars tilting during operation of the device eliminated, the cars traveling in unlimited directions in view of their free disposition within the bowl and influenced by the curved sections in the side wall of the bowl and the convex disk arranged centrally thereof as well as the cars abutting each other, it being noted that all shocks incident to the travel of the cars within the bowl being absorbed by the resiliently mounted band 57 on the body of the car.

While there is herein shown and described what is believed to be the preferred embodiment of the invention, it is nevertheless to be understood that minor changes may be made in the combination and arrangement of parts without departing from the spirit and scope of the invention as hereinafter claimed.

What is claimed as new is:

1. An amusement device of the character described comprising a pivoting bowl, passenger carrying cars freely movable in the bowl, said bowl being axially supported, means rotatable beneath the bowl and in engagement with the bottom wall thereof for causing the bowl to assume a tilted position during the pivotal movement thereof, said means including a rotatable disk and a roller carrying frame mounted on the disk engaging said bowl.

2. An amusement device of the character described comprising a pivoting bowl, passenger carrying cars freely movable in the bowl, said bowl being axially supported, means rotatable beneath the bowl and in engagement with the bottom wall thereof for causing the bowl to assume a tilted position during the pivotal movement thereof, said means including a rotatable disk, a roller carrying frame mounted on the disk engaging said bowl and means for rotating said disk.

3. An amusement device of the character described comprising a pivoting bowl, passenger carrying cars freely movable in the bowl, said bowl being axially supported, means rotatable beneath the bowl and in engagement with the bottom wall thereof for causing the bowl to assume a tilted position during the pivotal movement thereof, said means including a rotatable disk, a roller carrying frame mounted on the disk engaging said bowl, means for rotating said disk and a central hub carried by said disk rotatably mounted on the bowl support.

4. An amusement device of the character described comprising a pivoting bowl, passenger carrying cars freely movable in the bowl, said bowl being axially supported, means rotatable beneath the bowl and in engagement with the bottom wall thereof for causing the bowl to assume a tilted position during the pivotal movement thereof, said means including a rotatable disk, a roller carrying frame mounted on the disk engaging said bowl, means for rotating said disk, a stationary platform arranged beneath said bowl with the lower tilted end of the bowl in constant engagement therewith during pivotal movement.

5. An amusement device of the character described comprising a pivoting bowl, passenger carrying cars freely movable in the bowl, said bowl being axially supported, means rotatable beneath the bowl and in engagement with the bottom wall thereof for causing the bowl to assume a tilted position during the pivotal movement thereof, said means including a rotatable disk, a roller carrying frame mounted on the disk engaging said bowl, means for rotating said disk, a stationary platform arranged beneath said bowl with the lower tilted end of the bowl in constant engagement therewith during pivotal movement and guide rollers carried by said platform in engagement with said bowl.

6. In an amusement device of the type described wherein a pivotal bowl is axially supported on a stationary standard, with a platform disposed beneath said bowl and rotatable means beneath said bowl engaging said platform to cause the lower tilted edge of the bowl to constantly engage the platform, said bowl including a central bearing block, segment-shaped angle iron sections connected at their inner ends to said bearing block and connected at their adjacent side edges and track rails carried by the bottom face of the angle iron sections, one track rail to be engaged by the rotatable means and the other track rail engaging the stationary platform.

7. In an amusement device of the type described wherein a pivotal bowl is axially supported on a stationary standard, with a platform disposed beneath said bowl and rotatable means beneath said bowl engaging said platform to cause the lower tilted edge of the bowl to constantly engage the platform, said bowl including a central bearing block, segment-shaped angle iron sections connected at their inner ends to said bearing block and connected at their adjacent side edges, said segment-shaped frames being curved upwardly at their outer ends, outwardly curved rectangular frames connected to the outer ends thereof, bottom plates carried by the segment-shaped frames, concaved plates carried by the curved rectangular frames, and track rails carried by the bottom face of the angle iron sections, one track rail to be engaged by the rotatable means and the other track rail engaging the stationary platform.

8. In an amusement device of the type described wherein a pivotal bowl is axially supported on a stationary standard, with a platform disposed beneath said bowl and rotatable means beneath said bowl engaging said platform to cause the lower tilted edge of the bowl to constantly engage the platform, said bowl including a central bearing block, segment-shaped angle iron sections connected at their inner ends to said bearing block and connected at their adjacent side edges, said segment-shaped frames being curved upwardly at their outer ends, outwardly curved rectangular frames connected to the outer ends thereof, bottom plates carried by the segment-shaped frames, concaved plates carried by the curved rectangular frames, track rails carried by the bottom face of the angle iron sections, one track rail to be engaged by the rotatable means and the other track rail engaging the stationary platform and a convex disk overlying the central bearing block.

9. An amusement device of the type described comprising a bowl formed of segment-shaped angle iron members, a central bearing block having radial notches formed in the upper face thereof with the adjacent flanges of the angle iron sections disposed therein, connecting means between said sections, a standard having a ball and socket connection with said bearing block and rotatable means beneath said bowl in engagement therewith to cause the bowl to assume a tilted position during pivotal movement thereof upon operation of said rotating means.

10. An amusement device of the type described comprising a pivoting bowl, a central supporting standard therefor, a disk rotatable on said standard, a platform beneath said bowl, a roller carrying frame mounted on said disk in engagement with said bowl to cause the same to assume a tilted position with the lower side of the bowl engaging the platform, a circular rack on the bottom face of said disk and a motor driven gear meshing with said rack to rotate the disk.

11. An amusement device of the character described comprising a pivoting bowl positioned at an inclination, means engaged by the lower edge of the bowl, and means moving over the bottom of the bowl adjacent the pivot point to cause translation thereof with the peripheral bottom edge of the bowl rolling over the engaging means of the bowl.

12. An amusement device of the character described comprising a pivoting bowl positioned at an inclination, a platform beneath the bowl and engaged by the lower edge of the bowl, and means engaging the bowl and movable relative thereto to cause translation of the bowl with the peripheral bottom edge rolling over the platform.

13. An amusement device of the character described comprising a pivoting bowl positioned at an inclination, an axial bearing for the bowl, a platform beneath the bowl engaged by the lower peripheral edge of the bowl, rotatable means disposed beneath the bowl and engaging the bottom of the bowl at one side of the axial bearing and diametrically of the point of engagement of the bowl with the platform.

14. An amusement device of the character described comprising a pivoting bowl positioned at an inclination, an axial bearing for the bowl, a platform beneath the bowl engaged by the lower peripheral edge of the bowl, rotatable means disposed beneath the bowl and engaging the bottom of the bowl at one side of the axial bearing and diametrically of the point of engagement of the bowl with the platform, said rotatable means causing translation of the bowl with the points of engagement between the bowl, rotatable means and platform remaining constant.

In testimony whereof we affix our signatures.

AUGUSTE VEAUX.
GEORGE CHAKIRIS.